April 25, 1967 S. P. RONZHEIMER 3,316,350

BLACK LEVEL CONTROL CIRCUIT FOR A TELEVISION RECEIVER UTILIZING A SYNC PEAK KEYED AGC CIRCUIT

Filed Sept. 18, 1963 2 Sheets-Sheet 1

3,316,350
BLACK LEVEL CONTROL CIRCUIT FOR A TELEVISION RECEIVER UTILIZING A SYNC PEAK KEYED AGC CIRCUIT

Stephen P. Ronzheimer, Elmhurst, Ill., assignor to Hazeltine Research, Inc., a corporation of Illinois
Filed Sept. 18, 1963, Ser. No. 309,774
7 Claims. (Cl. 178—7.5)

Figure 1:
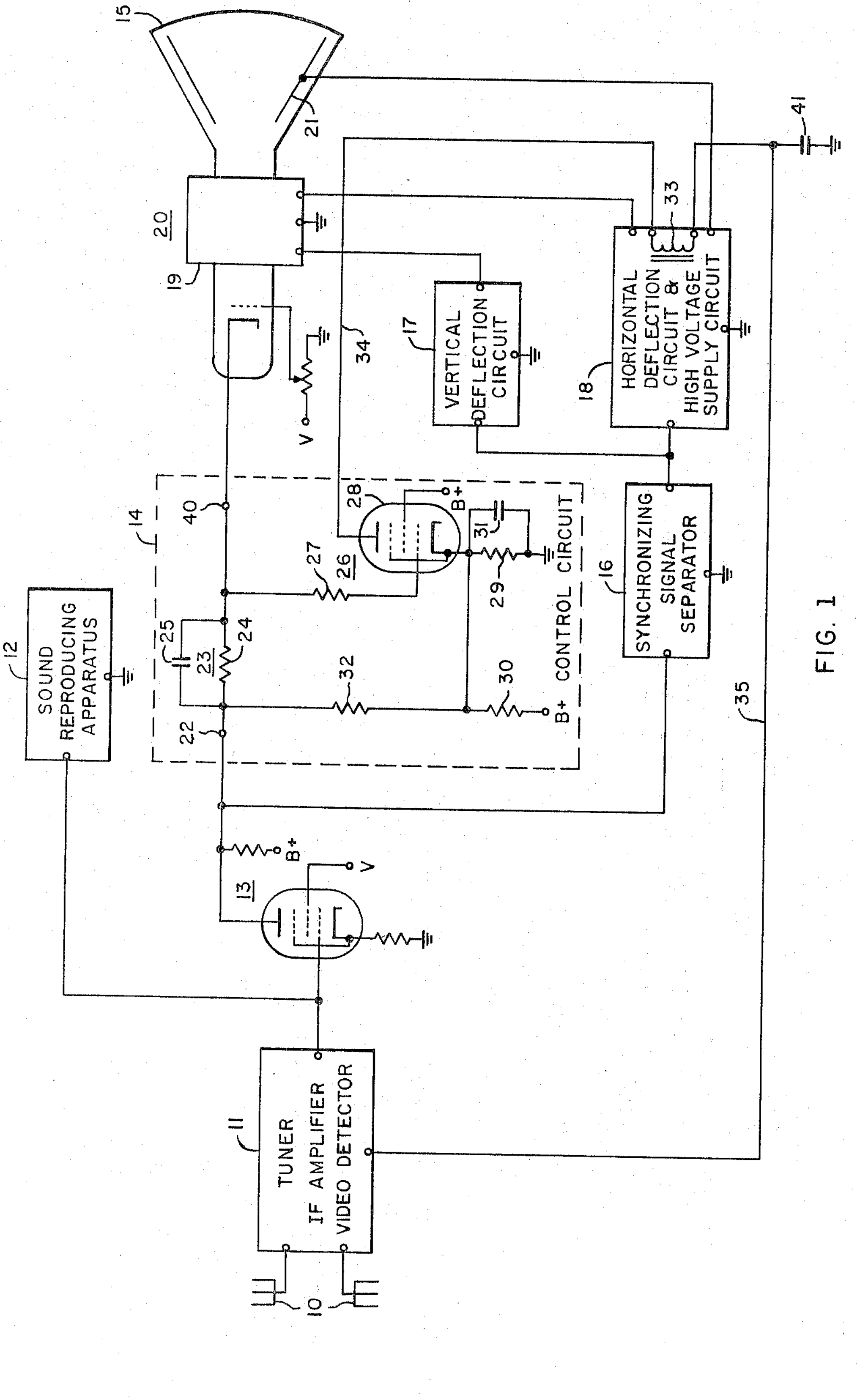

The present invention relates to a black level control circuit for a television receiver, and, more particularly, to a control circuit useful in such a receiver for preventing high voltage power supply overload, while, at the same time, maintaining correct black level operation at the image-reproducing device thereof.

One of the major problems encountered in black level stabilization system design, whether the stabilization be achieved by direct-current (D.-C.) restoration or by D.-C. coupling, is that the possibility exists that the high D.-C. beam currents required on scenes of high average brightness could overload the type of high voltage power supply circuit presently being used in television receivers. Such overloading would be observed by the viewer as substantial changes in the width to height ratio of the picture dimensions, improper horizontal scanning operation, and other such similarly objectionable effects.

The idea is presented in copending application, Ser. No. 309,773, filed Sept. 18, 1963, and entitled "Picture Control Apparatus for a Television Receiver," that it is possible to minimize such overload effects by reducing the video gain as scene brightness increases. Since the idea presented in that application is described with reference to a back porch keyed automatic-gain-control (AGC) circuit in which the blanking level of the video signal is stabilized at the picture tube, the turning down of the video gain—accomplished by supplementing the AGC signal with a voltage related to the average value of the transmitted scene—does not result in any sacrifice in black level performance. However, such is not the case with a sync tip keyed AGC circuit. With such an arrangement the synchronizing pulse peaks of the video signal and not the blanking level are stabilized at the picture tube. The effect of reducing the video signal gain to minimize overload then results in undesired blanking level drift, and, since the blanking level differs from the black level by a small fixed amount (set up), also results in undesired drift in background brightness. Thus, on the one hand, back porch keying with video signal reduction, i.e., with video turn down as scene brightness increases provides both correct black level operation at the picture tube and protection against high voltage power supply overload, whereas, on the other hand, sync tip keying with video turn down as scene brightness increases, only provides overload protection, the black level operation at the picture tube being somewhat less than desirable.

It is an object of the present invention, therefore, to provide a black level control circuit for a television receiver utilizing a sync tip keyed AGC circuit which operates to reduce the video signal gain as scene brightness increases to prevent overload of the picture tube power supply, and which correctly reproduces black level in the reproduced image over the entire range of scene contents, even in the presence of such video gain reduction, and, at a minimum of cost and circuit complexity.

Thus in accordance with the present invention a black level control circuit for a television receiver which utilizes a cathode-ray tube for purposes of image reproduction comprises means for supplying a video signal having alternating current components and a direct-current component representative of average scene brightness which may vary from scene to scene and having a synchronizing pulse level and a black level intended to correspond to black in the reproduced image, the supply means including control means for varying the magnitude of the supplied video signal, means for translating the supplied video signal to an input of the cathode-ray tube and to an input of a keyed automatic-gain-control circuit, wherein the translation causes the synchronizing pulse level of the translated video signal to vary at the input of the automatic-gain-control circuit with changes in average scene brightness, a keyed automatic-gain-control circuit responsive to the synchronizing pulse level of the video signal translated thereto for developing an output signal representative of the difference between the synchronizing pulse level and a reference potential, means coupled between the supply means and the automatic-gain-control circuit for varying the reference potential in accordance with changes in the average scene brightness of the supplied video signal and means for coupling the automatic-gain-control output signal to the control means for varying the magnitude of the supplied video signal to stabilize the synchronizing pulse level at the input of the automatic-gain-control circuit, thereby stabilizing black level at the input of the cathode-ray tube and limiting the amount of beam current flowing in the cathode-ray tube on scenes of high average brightness.

For a better understanding of the present invention, together with other and further objects thereof, reference is had to the following description taken in connection with the accompanying drawings, and its scope will be pointed out in the appended claims.

Figure 2:
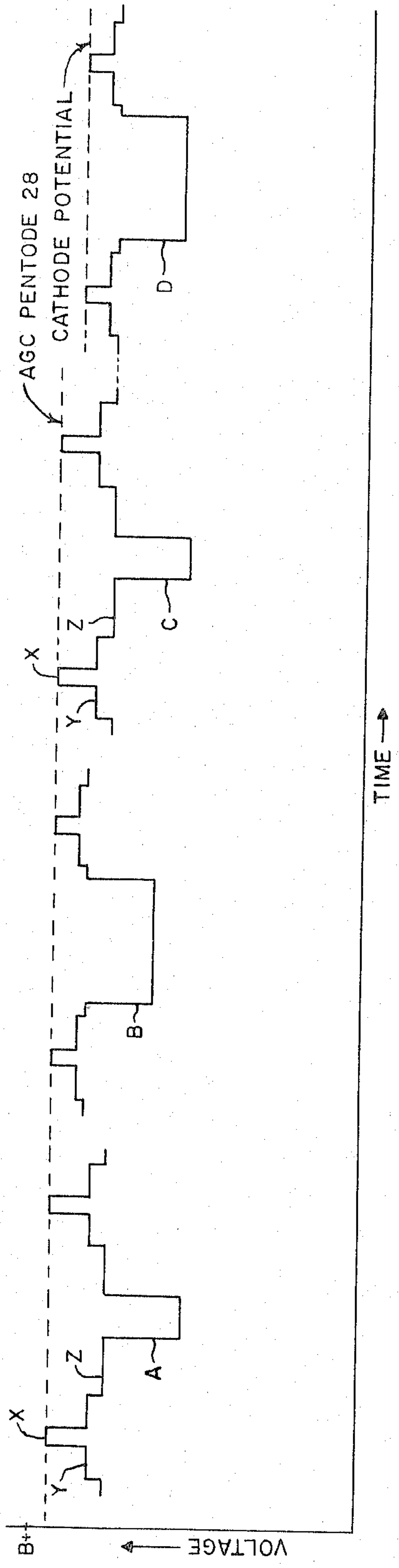
Figure 3:
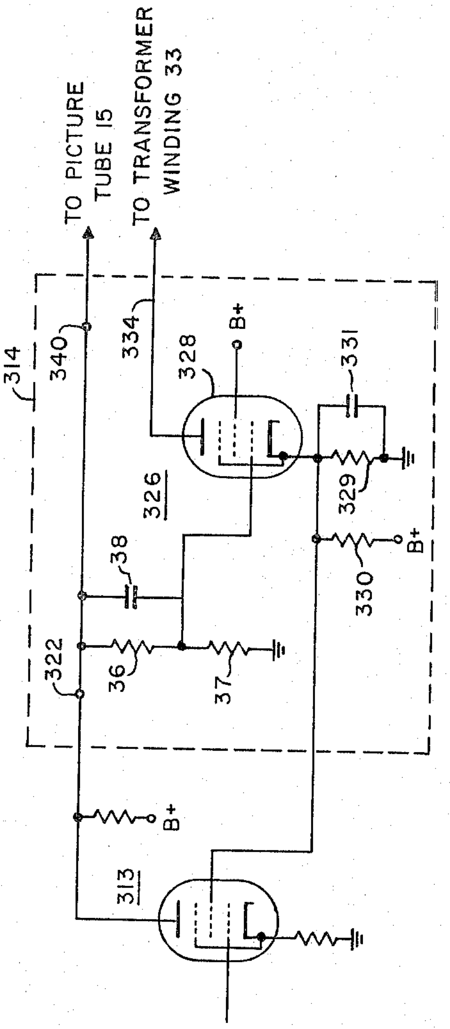

Referring to the drawings:

FIG. 1 is a circuit diagram, partly schematic, of a television receiver embodying a black level control circuit constructed in accordance with a particular form of the present invention;

FIG. 2, A through D, inclusive, are signal waveforms useful in explaining the advantage of using a particular form of the present invention over the more conventional type of circuitry; and FIG. 3 is an alternative form of a black level control circuit useful in the television receiver of FIG. 1 and constructed in accordance with the present invention.

*General*

Referring to FIG. 1, there is shown a television receiver embodying a black level control circuit constructed in accordance with one form of the present invention. Thus, with the exception of the control circuit, and unless otherwise noted, the receiver may be of conventional construction. The receiver comprises in part, antenna system 10 coupled to the input of unit 11 which includes the usual tuner, intermediate-frequency (IF) amplifier, and video detector from which are derived a sound modulated intercarrier beat note component and a video signal component. The sound component is applied to sound reproducing apparatus 12 wherein it is amplified, detected, and reproduced by the sound reproducing device. The video signal component is D.-C. coupled from the video detector in unit 11 to the control grid of video amplifier 13 wherein it is amplified, reversed in polarity, and applied through control circuit 14 to a cathode-ray type image-reproducing device or picture tube 15, in a manner to be subsequently described. The video signal developed by amplifier 13 is also applied to synchronizing signal separator 16 wherein the synchronizing pulses in the composite signal are stripped and applied to the vertical and horizontal circuits 17 and 18. Beam deflection signals are developed in these units in the usual manner and applied to the deflection yoke 19 of image-reproducing apparatus 20. Unit 18 additionally includes a high voltage power or energy supply which provides the operating potential required by the high voltage anode 21 of picture tube 15. As will become clear hereinafter, control circuit 14, as embodied in FIG. 1 provides correct black level operation in the reproduced image over the entire range of scene contents while preventing power supply overload by reducing the video signal gain as the average brightness of the transmitted scene increases.

*Description and operation of black level control circuit 14 of FIG. 1*

Thus, referring now more particularly to the black level control circuit 14 which embodies one form of the present invention, the arrangement there represented includes means for supplying a video signal having an average value which may vary from scene to scene. As represented in FIG. 1, such means may include that portion of the television receiver immediately to the left of control circuit 14, i.e., may include antenna 10, unit 11, and video amplifier 13. For ease of discussion, however, such means will be referred to simply as input terminal 22 (connected to the plate of amplifier 13).

The signal so supplied is, in effect, a composite signal consisting of an image-representative portion and a synchronizing portion. The image or picture portion is composed of A.-C. and D.-C. components representing respectively the instantaneous brightness and average brightness value of the transmitted image at successive points along successive closely spaced scanning lines. The synchronizing portion, on the other hand, includes both synchronizing signals and blanking signals, the synchronizing signals comprising a series of recurrent or synchronizing pulses which mark the instant at which each of the successive scanning lines is generated. These synchronizing pulses may extend either in a positive or negative direction from a predetermined level, hereinafter referred to as the blanking level, depending upon the polarity of the video detector in unit 11. In the description that follows, it is to be understood that the polarity of the video detector is such that, at terminal 22, the synchronizing pulses extend in a positive direction from the blanking level. There is also a second level of interest in the transmitted signal, a level intended to correspond to black in the reproduced image and subsequently referred to as the black level. For the purpose of the discussion that follows, it is to be understood that the black level is present in every transmitted signal, although, generally, this is not the case. This assumption is simply made for the sake of clarity in describing the operation of the invention. These three levels of intensity—the level to which the synchronizing pulses extend, the blanking level, and the black level—are each mutually related through the medium of the video signal waveform, as transmitted in accordance with Federal Communications Commission regulations.

Control circuit 14 also includes means, such as network 23, for coupling the supplied video signal to the picture tube 15. Network 23 specifically includes a resistance-capacitance circuit 24, 25 connected between input terminal 22 and output terminal 40, which in turn is connected to the cathode of tube 15, so that picture tube beam current is arranged to flow through it. The present invention, however, is not limited to such a coupling network as is represented in FIG. 1. Any one of a number of coupling arrangements more fully described in the aforementioned copending application, Ser. No. 309,-773, could be used without affecting the operation of control circuit 14 or impairing its usefulness in any way.

Control circuit 14 additionally includes stabilizing means, such as AGC circuit 26, coupled to the video signal coupling path for stabilizing the synchronizing pulses of the video signal at a given potential at picture tube 15. The video signal developed on the picture tube side of network 23 is coupled to AGC circuit 26, specifically through resistor 27 to the control grid of pentode 28, the cathode of which is connected to ground through a network comprising resistors 29 and 30, and bypass capacitor 31. Network 29, 30, 31, in conjunction with voltage supply B+, comprises part of a cathode bias network for pentode 28, the other part of the network being resistor 32 connected to input terminal 22, the reason for which will be made clear hereinafter.

Pentode 28 is keyed into plate current conduction by flyback pulses derived from transformer 33 of the horizontal sweep output circuit of unit 18, coupled directly to the plate of pentode 28. Since the flyback or keying pulses have peak portions that occur in overlapping time relationship with the synchronizing pulses of the video signal, the AGC effect is derived only during the time at which the synchronizing pulses are present at the control grid of pentode 28. The AGC signal so derived is coupled through wire 34, transformer winding 33, and wire 35 to the amplifiers within unit 11 to control the gain therein so that the synchronizing pulses are stabilized at picture tube 15 at a potential very nearly equal to the bias voltage established at the cathode of pentode 28. In addition, capacitor 41 is included to prevent rapidly varying signals from changing the bias voltage prescribed by the AGC effect.

As thus far described, AGC circuit 26 operates in a manner almost identical to that of the conventional sync tip AGC keyer but with one major difference. As is shown in FIG. 1, the control grid of the vacuum tube in AGC circuit 26 is not connected to the video amplifier plate, as is customary with the conventional AGC keyer, but to the picture tube cathode. Therefore, instead of being stabilized at terminal 22, the synchronizing pulse peaks are stabilized at the cathode of picture tube 15. It will now be described with reference to FIG. 1, how, by coupling the control grid of the vacuum tube in AGC circuit 26 to the picture tube side of network 23 rather than to the video amplifier side, AGC circuit 26 additionally operates to vary the magnitude of the supplied video signal in response to variations in its average value to prevent overload of the high voltage power supply on scenes having a high average brightness value.

Thus, referring once again to FIG. 1, application of the supplied video signal to picture tube 15 causes beam current to flow, the direction of flow being such as to make the potential of the cathode of tube 15 positive with respect to the plate potential of video amplifier 13, and, by an amount equal to the voltage drop across resistor 24. Since the amount of beam current that flows is proportional to the average brightness value of the transmitted scene, it follows that the potential developed at the cathode of picture tube 15, i.e., across resistor 24, is an indication of scene brightness. As the average brightness value of the transmitted scene increases, the increasing positive potential at the cathode of picture tube 15 causes AGC pentode 28 to develop more AGC voltage. This increase in AGC voltage is coupled to the amplifier stages in unit 11 as previously described to reduce the magnitude of the supplied video signal. In this manner, possible high voltage supply overload is prevented.

However, it is not too difficult to visualize that if AGC circuit 26 performs the dual function of stabilizing the synchronizing pulse peaks and turning down the video gain to prevent power supply overload, the net effect at the cathode of picture tube 15 would be that the blanking level of the video signal, and also the black level, would drift with respect to the level at which the synchronizing pulses are stabilized. This is more clearly shown in FIG. 2 waveforms A and B where X, Y, and Z represent the sync peak level, blanking level and black level of the video signal respectively. Thus, black level operation at picture tube 15 would be somewhat impaired. Furthermore, the amount of drift or variation would be related to the amount of video turn down, i.e., to the average value of the video signal, or, more particularly, to the average value of beam current that flows. Stated another way, the brighter the scene, the more beam current that flows, the more the video gain is reduced, and the more undesirable is the black level drift.

It is also to be noted that if the average brightness value of the transmitted scene were to decrease, the AGC voltage developed by pentode 28 would also decrease, thereby increasing the magnitude of the supplied video signal. No overload compensation would be necessary on such scenes but the problem of black level drift would still be present.

However, in accordance with the teachings of the present invention, control circuit 14 additionally includes means, such as resistor 32, coupled between input terminal 22 and the cathode of pentode 28 for compensating the undesired black level variations, at the cathode of picture tube 15. Thus, an increase in scene brightness, for example, causes a decrease in the average value or D.-C. component of the signal developed at the plate of video amplifier 13 and a corresponding increase in picture tube beam current flowing through resistor 24. This increase in voltage across resistor 24 initiates AGC action which causes a reduction in the magnitude of the supplied video signal, and, therefore, a further reduction in the D.-C. potential at the plate of video amplifier 13. This over-all change in D.-C. potential is coupled through resistor 32 to the cathode of AGC pentode 28 to lower the cathode bias established by network 29, 30, 31, thereby making pentode 28 reference sync tips to a reduced potential. As a result, the drift in black level is corrected. Conversely, a decrease in scene brightness would cause pentode 28 to reference sync tips to a higher potential. In this way, a variable bias is applied to the cathode of pentode 28 to permit a variation in the level at which the synchronizing pulses in the video signal are ultimately stabilized. By proportioning resistors 29, 30, and 32, properly, the cathode potential of AGC pentode 28 can be made to change in the correct amount to maintain blanking level or even black level constant at picture tube 15 with changes in scene brightness, as shown in FIG. 2, waveforms C and D.

While applicant does not wish to be limited to any particular set of circuit constants, the following have proved useful in a black level control circuit of FIG. 1.

| | | |
|---|---|---|
| Resistor 24 | kilohms | 100 |
| Resistor 27 | do | 18 |
| Resistor 29 | do | 82 |
| Resistor 30 | do | 12 |
| Resistor 32 | do | 82 |
| Capacitor 25 | microfarads | 0.22 |
| Capacitor 31 | do | 0.1 |
| Pentode 28 | | ½5AN8 |
| Potential B+ | volts | 265 |

There is shown in FIG. 3 a modified form of black level control circuit 314 similar to black level control circuit of FIG. 1, in which corresponding components carry the same reference numerals as in FIG. 1 except preceded by the numeral "3." Control circuit 314 differs from the previously described circuit in that the black level compensation is taken from the screen grid circuit of video amplifier 313 instead of from the plate circuit. In addition, by making network 329, 330, 331, common to both the screen grid circuit of amplifier 313 and cathode circuit of AGC pentode 328, as shown in FIG. 3, black level compensation and overload protection on high average brightness scenes can be achieved simultaneously, in a manner now to be described.

In operation, the supplied video signal at input terminal 322 is coupled to the control grid of pentode 328 through network 36, 37, 38 which is so chosen that, when taken in conjunction with the D.-C. coupling from the screen grid of amplifier 313 to the cathode of pentode 328, the A.-C. translation ratio from the input of amplifier 313 to the AGC tube 328 is greater than the D.-C. translation ratio. The translation characteristic is such that as scene brightness increases the excess A.-C. translation over D.-C. translation causes pentode 328 to develop more AGC voltage with the ensuing result that the magnitude of the supplied video signal is reduced. In this manner, possible power supply overload is prevented. At the same time, due to the presence of network 329, 330, 331 in the screen grid circuit of amplifier 313, a degenerative voltage is developed at the cathode of pentode 328. As scene brightness increases, more screen grid current flows in amplifier 313, thereby lowering the cathode bias potential of pentode 328 so that sync tips are referenced to a reduced potential with the result that the black level drift which would otherwise occur is compensated. Conversely, a decrease in the average brightness value of the transmitted scene causes pentode 328 to develop less AGC voltage with the result that the magnitude of the supplied video signal is increased. Less video amplifier screen grid current flows on this lower average brightness scene so that pentode 328 references sync tips to a higher potential. In this manner, black level is once again stabilized at the cathode of picture tube 15.

In addition to preventing high voltage power supply overload on scenes of high average brightness, the present invention operates to reduce any annoying subjective effects that may be produced upon the viewer due to changes in the average brightness value of the transmitted scene. That is, by reducing the magnitude of the supplied video signal as scene brightness increases, the amount of beam current flowing in picture tube 15 is limited so that the reproduced image is prevented from becoming excessively bright. Thus, changes in scene brightness, as from a low brightness scene to a high brightness scene, do not prove objectionable to the viewer. It is to be understood that this subjective impression feature of the invention is present even if the television receiver were designed with scanning circuit power capability sufficient to eliminate any possibility of high voltage power supply overload.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A black level control circuit for a television receiver which utilizes a cathode-ray tube for purposes of image reproduction, comprising:

means for supplying a video signal having alternating-current components and a direct-current component representative of average scene brightness which may vary from scene to scene, and having a synchronizing pulse level and a black level intended to correspond to black in the reproduced image, said supply means including control means for varying the magnitude of said supplied video signal;

means for translating said supplied video signal to an input of said cathode-ray tube and to an input of a keyed automatic-gain-control circuit, wherein said translation causes the synchronizing pulse level of said translated video signal to vary at the input of said automatic-gain-control circuit with changes in average scene brightness;

a keyed automatic-gain-control circuit responsive to the synchronizing pulse level of the video signal translated thereto for developing an output signal representative of the difference between said synchronizing pulse level and a reference potential;

means coupled between said supply means and said automatic-gain-control circuit for varying said reference potential in accordance with changes in the average scene brightness of said supplied video signal;

and means for coupling said automatic-gain-control output signal to said control means for varying the magnitude of said supplied video signal to stabilize said synchronizing pulse level at the input of said automatic-gain-control circuit, thereby stabilizing black level at the input of said cathode-ray tube and limiting the amount of beam current flowing in the cathode-ray tube on scenes of high average brightness.

2. A black level control circuit in accordance with claim 1 in which said automatic-gain-control output signal varies the magnitude of the supplied video signal as an inverse function of variations in average scene brightness.

3. A black level control circuit in accordance with claim 1 in which said signal translating means translates said supplied video signal identically to the input of said cathode-ray tube and said automatic-gain-control circuit and in which said signal translating means also translates the direct-current component of beam current from said cathode-ray tube to said signal supply means, thereby causing the synchronizing pulse level of the translated video signal to vary in accordance with changes in average scene brightness.

4. A black level control circuit in accordance with claim 1 in which said signal translating means couples said supplied video signal directly to the input of said cathode-ray tube and in which said signal translating means translates said supplied video signal to the input of said automatic-gain-control circuit with the direct-current component attenuated by a predetermined amount in relation to the alternating-current components of said video signal, thereby causing the synchronizing pulse level of said translated video signal to vary at the input of said automatic-gain-control circuit in accordance with changes in average scene brightness.

5. A black level control circuit in accordance with claim 2 in which said signal supply means includes a video signal amplifier output stage having its output coupled to the input of said signal translating means for supplying said video signal thereto, and in which said reference potential varying means includes a resistance coupled between the output of said amplifier and said automatic-gain-control circuit for coupling the direct-current component of said supplied video signal to said automatic-gain-control circuit for varying said reference potential in accordance with changes in average scene brightness of said supplied video signal.

6. A black level control circuit in accordance with claim 2 in which said signal supply means includes a pentode vacuum tube video signal amplifier output stage having its anode coupled to the input of said signal translating means for supplying said video signal thereto, and in which said reference potential varying means includes a resistance coupled between the sceen grid of said amplifier and said automatic-gain-control circuit for supplying to said automatic-gain-control circuit a signal representatve of the average scene brightness of said supplied video signal for varying said reference potential in accordance with changes in the average scene brightness of said supplied video signal.

7. A black level control circuit in accordance with claim 5 in which said automatic-gain-control circuit includes a vacuum tube arranged as a keyed rectifier, in which said signal translating means translates the supplied video signal to the control grid of said vacuum tube, and in which said reference potential varying means is coupled between said supply means and the cathode of said vacuum tube.

References Cited by the Examiner

UNITED STATES PATENTS

| | | | |
|---|---|---|---|
| 2,632,802 | 3/1953 | Vilkomerson et al. | 178—7.3 |
| 2,872,513 | 2/1959 | Kraft | 178—7.3 |

DAVID G. REDINBAUGH, *Primary Examiner.*

R. L. RICHARDSON, *Assistant Examiner.*